United States Patent Office 3,110,744
Patented Nov. 12, 1963

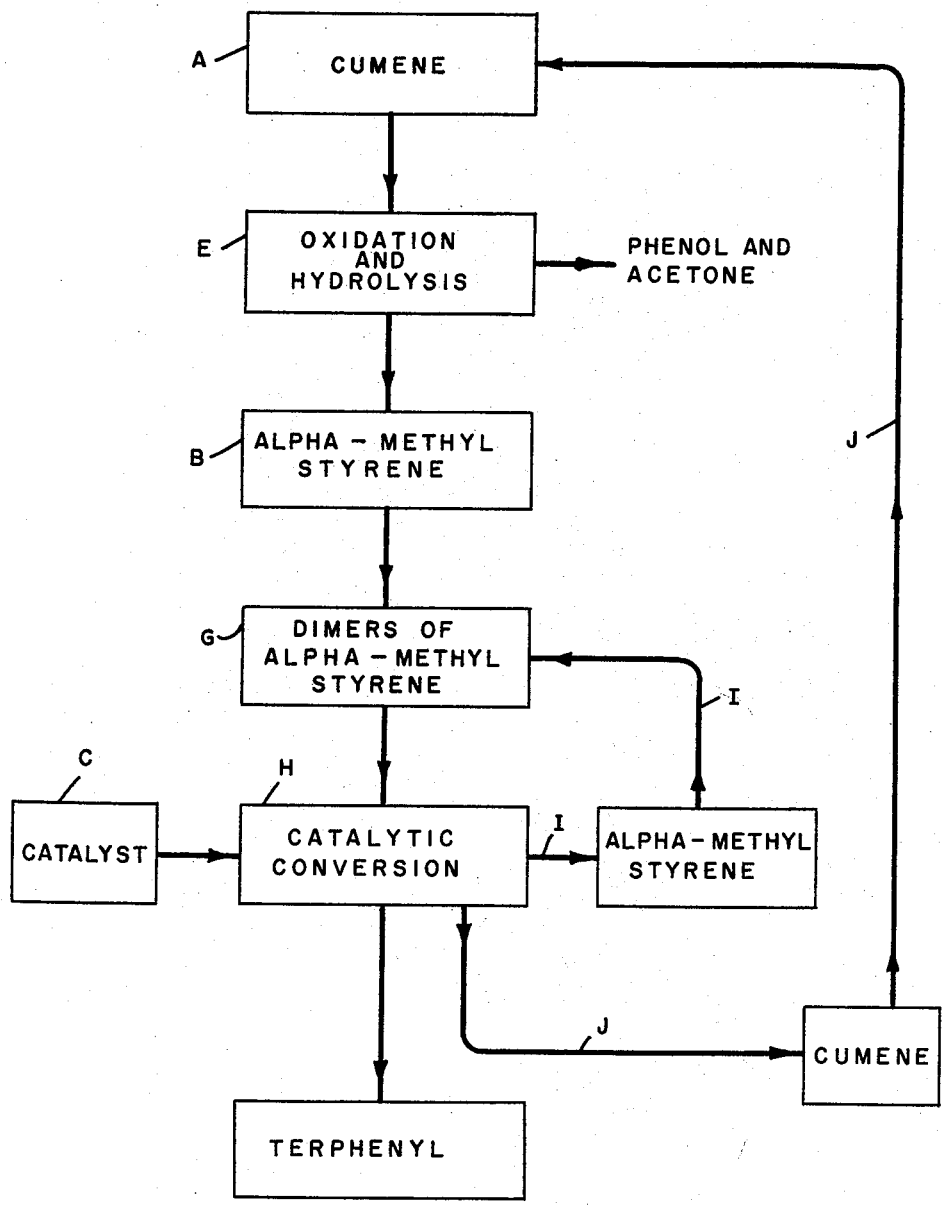
FIG. I
INVENTORS
MILTON M. WALD
LYNN H. SLAUGH

3,110,744
HYDROCARBON CONVERSION PROCESS
Milton M. Wald, Walnut Creek, and Lynn H. Slaugh, Pleasant Hill, Calif., assignors to Shell Oil Company, a corporation of Delaware
Filed Nov. 24, 1959, Ser. No. 855,073
3 Claims. (Cl. 260—670)

This invention relates to the catalytic conversion of alpha alkyl styrene compounds to the corresponding polyphenyl compounds. More particularly, it relates to the catalytic isomerization and dehydrocyclization of alpha methyl styrene dimer to para-terphenyl.

A process has been developed and disclosed in the art for the preparation of phenol by oxidation of cumene to form a hydroperoxide, which in turn is cleaved to produce phenol and acetone as major products with a substantial amount of alpha methyl styrene as a by-product. In order for the process to be entirely economical, an up-grading of the alpha methyl styrene to more practical products is desired.

A method has also been shown in the art for the production of dimers of alpha alkyl styrenes by treatment of the same with aqueous sulfuric acid. This results in a mixture of dimers for the most part.

Still other known processes in the art have been shown for the conversion of aliphatic compounds to aromatics and for the isomerization of aliphatic compounds to analogs thereof. However, at no place in the art has it been suggested that such processes might be applied to compounds such as those derived by dimerizing alpha methyl styrene.

It is an object of the present invention to provide an improved process for the conversion of alpha alkyl styrenes to corresponding terphenyl compounds. It is a further object of the invention to improve the efficiency of this process by recycling of some of the by-products. It is a still further object of the invention to improve the economics of the above-mentioned process for the production of phenolic compounds. Other objects and advantages of this invention will be apparent to one skilled in the art from the description of the invention, which is made with reference in part to the accompanying drawing in which the sole FIGURE outlines a preferred embodiment of the invention.

Now, in accordance with the present invention, a process is provided for converting dimers of alpha alkyl styrenes to the corresponding terphenyl compounds which comprises isomerizing and dehydrocyclizing the dimers to the terphenyl compounds, such as by heating the dimers in contact with a catalyst of the group consisting of iodine, iodine species (as defined more particularly hereinafter), or supported catalysts of group VI metal oxides.

Alpha methyl styrene which is formed during the isomerizationdehydrocyclizing step is usefully recycled to a dimerizing preparation of additional quantities of the dimer from the terphenyl compounds are formed. Still further economies are achieved in the most integrated form of the process by recycling cumene which is formed at the same time as alpha methyl styrene, the cumene being recycled to the oxidizer in connection with the phenol production operation.

The basic steps of this process are as follows: alpha methyl styrene conversion to dimer and thence to terphenyl being taken as a preferred version of the essential steps of the invention.

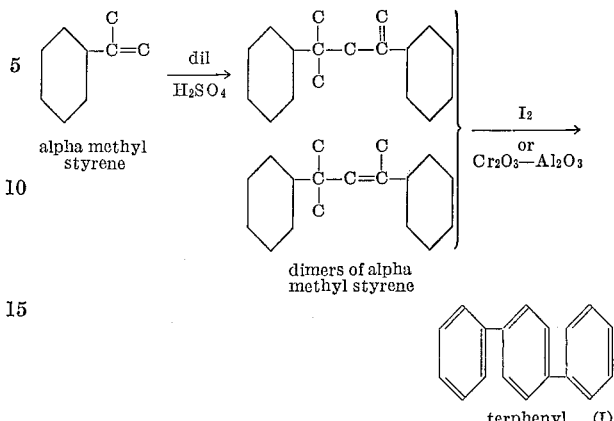

According to the above formula and equation, alpha methyl styrene is converted to isomeric dimers by treatment with sulfuric acid. These dimers are in turn subjected to the catalytic affects of iodine, iodine species or group VI metal oxides deposited on alumina, whereby a complex series of inter-related conversions take place, including rearrangement, cyclization and dehydrogenation. None of the prior art teaches that such inter-related mecahnisms can be achieved when applied to the structures of such materials as dimers of alpha alkyl styrenes.

In accordance with one aspect of the invention, merely catalytic amounts of iodine are utilized as the catalyst for conversion of the dimers to the corresponding terphenyl compounds. This particular version of the process involves the contacting of the dimers with a catalytic amount, 0.5–2.5 mole percent, of iodine based on the total dimeric materials at a temperature in the range of about 350–550° C., at a pressure in the range from about less than atmospheric pressure to about 250 p.s.i.g. for a time in the range from about 1 second to about 5 minutes. Under some circumstances it may be desirable to utilize up to or even more than stoichiometric amounts of iodine for this conversion although this is not essential.

Preferably the dimers and the iodine are conducted into a contact space in gaseous form and are conducted there through at a space velocity sufficient to provide a predetermined time of reaction within the time specified above. The reactor space may be a conventional furnace containing coils of tubing or any known heat exchange device or on the other hand may be a pressure device of any of the well known types. The effluent from the reactor comprises a mixture of iodine and a reaction product comprising a terphenyl and as a by-product a mixture of alpha alkyl styrene and a cumene compound. These are readily separated since the terphenyl compound is normally highly insoluble and crystalline in character and readily separates from the liquid products otherwise obtained. Separation may be by means of decanting, filtration or distillation and the alpha alkyl styrene and cumene compound may be recycled as referred to hereinbefore. Coking can be minimized by utilizing relatively low pressures, that is, no higher than about 250 p.s.i.g. This problem is not present when stoichiometric amounts of iodine are utilized. The iodine may be species formed in the process regenerated to elemental iodine or may be recycled as such since apparently elemental iodine is formed during the catalytic reaction.

The process of the present invention applies especially to alpha alkyl styrenes having the general formula

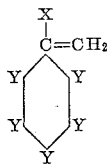

wherein X is an alkyl group having from 1 to 5 carbon atoms but is preferably methyl and Y may be hydrogen or alkyl radical, but is preferably hydrogen or methyl, ethyl, propyl or isopropyl and wherein at least two of the carbon atoms bear hydrogen substituents directly attached to the ring carbon atom. While the present invention has been and will be described particularly with reference to the use of dimers of alpha methyl sytrene, the invention is equally well adapted to the use of other dimers of alpha alkyl styrenes or their mixtures, including but not limited to, alpha-methyl-para-methyl-styrene, alpha-methyl-para-ethyl styrene, alpha-methyl-para-propyl styrene, alpha-methyl-para-isopropyl styrene, alpha-methyl-meta-methyl-styrene, alpha-ethyl-styrene, alpha-ethyl-para-ethyl styrene, alpha-propyl-para-propyl styrene and the like.

The process may be applied to diphenyl isoalkanes containing a quaternary carbon atom, such as 1,3-diphenyl-3-methylpentane.

Satisfactory results are obtained by the use of group VI metal oxides deposited upon supports such as activated alumina, silica, pumice, etc. in place of the use of iodine or iodine species for the conversion of dimers of alpha alkyl styrenes to the corresponding terphenyls. These catalysts have been described in the literature for other purposes and can be prepared by two alternative means, one being the coprecipitation of hydroxides of aluminum and chromium, for example, or alternatively the impregnation of alumina with a chromic acid or a chromium salt, such as chromium nitrate. The products are then calcined to expel water and any volatile acid and preferably are reduced by hydrogen immediately prior to their use. Preferably also they contain promoters such as palladium or platinum (0.01% by weight), cerium, cobalt, rubidium (0.2–0.75%) or especially potassium or cerium when these are utilized in amounts from about 0.25 to about 2% by weight of the combined group VI metal oxide on activated alumina. These are preferably added as cerium oxide or cerium nitrate or the corresponding potassium compounds. Details of their preparations are given for example in Industrial and Engineering Chemistry, volume 37, page 356 (1945) by Archibald and Greensfelder.

The two most preferred metal oxides to be used in conjunction with activated alumina are chromium oxide or molybdenum oxide. The process is preferably conducted by packing a contact tube with the catalyst and passing the vaporized alpha alkyl styrene dimers thereover at temperatures between about 350 and 550° C. for contact times between about 1 second and five minutes. In addition to the preparation of the most desired terphenyl from the alpha alkyl styrene utilized, important by-products comprise the cumene compound and alpha alkyl monomer. These can be recycled as suggested above and as given in greater detail hereinafter for further improved efficiencies in coordinated processes.

The dimerization of alpha alkyl styrenes has been described in the literature such as in the Hersberger patent, U.S. 2,429,719. The process broadly comprises treatment of an alpha alkyl styrene with sulfuric acid of 30–65% concentration at a temperature between 150° F. and 220° F. (65–105° C.) to obtain the unsaturated dimer. Preferably the acid is utilized in an amount of 0.5–5 volumes based on the volume of the alpha alkyl styrene monomer. The structure of the resulting dimer is normally distributed between an equilibrium mixture wherein one unsaturated linkage is between a chain carbon atom and a substituent therefrom and a second isomer wherein the unsaturated linkage exists within the chain connecting the two aryl radicals. Reference is made in this respect to the structural formulae given hereinbefore.

In accordance with this invention, efficiencies are achieved by conducting both the dimerizing and the subsequent catalytic conversion in conjunction with a phenol plant wherein the phenol is produced by oxidation and "cleavage" of a cumene compound. This process has been described in the Lorand et al. patent, U.S. 2,548,435; the Filar et al. patent, U.S. 2,663,735; and the Armstrong et al., U.S. 2,728,795. Briefly, the oxidation of cumene compounds is preferably carried out by passing an oxygen-containing gas through the cumene compound in a liquid phase at a temperature between about 20 and about 95° C. in the presence of an aqueous medium selected from the group consisting of liquid water and aqueous alkali. Since this process results in the formation of a hydroperoxide in order to form the corresponding phenol and aliphatic ketone. This is preferably performed by decomposition of the hydroperoxide with a homogeneous reaction medium comprising an aliphatic ketone and concentrated sulfuric acid, the concentration of the acid in said medium being between about 0.05 and about 10% by weight and any water present being in an amount less than that required to render the reaction medium heterogeneous. One of the by-products of this reaction in addition to the phenol compound and the aliphatic ketone is the alpha alkyl styrene monomer which is utilized in a dimerizing reaction and subsequently in the preparation of the terphenyl compounds by catalytic treatment as described hereinbefore.

Since one of the other major by-products of the catalytic conversion is a cumene compound, this can be recycled to the oxidation step wherein cumene compound is oxidized to form a hydroperoxide. It will thus be seen that an inter-related series of reactions result with increased efficiency and ease due to these several preferential recycling steps, the cumene from the catalytic conversion being recycled to the hydroperoxidation, while the alpha alkyl styrene by-product from the catalytic conversion being recycled to the dimerizing step. The preferred version of this invention, therefore, encompasses such an inter-related series of processes.

The drawing graphically illustrates the interrelation of these several processes. Cumene from a source A is treated according to the process of reaction E involving oxidation followed by hydrolysis to result in the formation of phenol and acetone and a major by-product B, namely, alpha-methyl styrene. The latter is subjected to a dimerizing reaction under the conditions of process G, resulting in the formation of dimers of alpha-methyl styrene. These are subjected to a catalytic conversion operation H, the catalyst being iodine or, alternatively, a chromia-alumina catalyst promoted with potassium. This catalytic conversion results in rearrangement, cyclization and dehydrogenation, with the formation of the desired end product, namely, terphenyl and major amounts of by-products, alpha-methyl styrene and cumene. The alpha methyl styrene is recycled by line I to the dimerizing treatment G while the by-product cumene is recycled by line J for oxidation and hydrolysis.

The invention may be particularly illustrated by the following examples which, however, are not to be construed as limiting the scope thereof.

EXAMPLE I

Dimers of alpha methyl styrene were treated in accordance with the conditions given in Table 1 below under catalytic conversion conditions involving temperatures of 500–525° F., residence time of 0.1–1 minutes in order to obtain reaction products including the desired terphenyl and major amounts of cumene and alpha styrene. Runs A and B were made utilizing the indicated proportions of isopropyl iodide as the iodine species while runs C, D and E were made utilizing a chromia alumina catalyst promoted with 1% by weight of potassium. The terphenyl separates as a crystalline solid from the liquid components of the reaction product and is easily separated therefrom. The cumene is recycled to the initial step in the integrated process, namely, wherein cumene is oxidized to form the corresponding hydroperoxide. The alpha methyl styrene by-product is recycled in accordance with the preferred version of the shortened integrated process as supplementary feed material for the dimerizing reaction.

Table 1.—Dehydroisomerization/Alpha-Methyl Styrene Dimer

| Run No. | A | B | C | D | E |
|---|---|---|---|---|---|
| Temperature, °C | 500 | 525 | 500 | 500 | 525 |
| Residence Time, min | 1 | 1 | 0.5 | 0.1 | 0.2 |
| Feed, moles: | | | | | |
| alpha methyl styrene dimer | 0.50 | 0.40 | 0.31 | 0.51 | 0.27 |
| $iC_3H_7I$ | 0.010 | 0.024 | (b) | (b) | (c) |
| Products, $C_{18}$ equiv./100 moles dimer consumed: | | | | | |
| $H_2$ [a] | | | 45.1 | 33.0 | 29.2 |
| $C_6H_5CH_3$ | 1.9 | 3.2 | 1.3 | 2.0 | 0.8 |
| $C_5H_{10}$ | 2.2 | 3.4 | 2.0 | 2.3 | 0.9 |
| Cumene | 42.1 | 38.8 | 29.7 | 19.1 | 20.0 |
| alpha methyl styrene | 0.3 | sm. | 33.3 | 52.8 | 54.4 |
| Unidentified $C_{18}$ hydrocarbons | 6.9 | 7.6 | 4.0 | 3.1 | 2.6 |
| Terphenyl | 1.7 | 4.33 | 2.0 | 3.0 | 3.0 |
| Percent conversion | 80.6 | 8.64 | 98.4 | 92.7 | 92.9 |

[a] Moles/100 moles dimer consumed.
[b] Potassium promoted chromia-alumina packed in reactor.
[c] Reactor tube loaded with one-fourth of the amount of chromia-alumina used in previous experiments.

EXAMPLE II

In another experiment, equimolar amounts of iodine were utilized, based on the alpha-methyl styrene dimer feed. Table 2 shows the conditions used and the products obtained.

Table 2.—Dehydroisomerization/Alpha-Methyl Styrene Dimer

| Run No. | H |
|---|---|
| Temperature, °C | 500 |
| Pressure | atm. |
| Residence Time | 3 sec. |
| Feed, moles alpha methyl styrene dimer | 0.152 |
| Products, $C_{18}$ equiv./100 moles alpha methyl styrene dimer fed | |
| Cumene | 48.2 |
| Alpha methyl styrene | 36.1 |
| Unidentified hydrocarbon | 8.0 |
| p-Terphenyl | 5.5 |
| Conversion, percent | 89.7 |
| $I_2$/feed mole ratio | 1.0 |

EXAMPLE III

Use was made of chromia supported on alumina, under the conditions described in Table 3. Twenty-five grams of catalyst were employed in the conversion of 0.022 mole of dimer. The products obtained also are given in Table 3.

Table 3.—Dehydroisomerization/Alpha-Methyl Styrene Dimer

| Run No. | F | G |
|---|---|---|
| Temperature, °C | 500 | 450 |
| Pressure | atm. | atm. |
| Residence time | <1 min. | ~1 min. |
| Feed, moles, alpha-methyl styrene dimer | 0.002 | 0.002 |
| Products, $C_{18}$ equiv./100 alpha-methyl styrene dimer fed: | | |
| Cumene | 17.7 | 29.7 |
| alpha-methyl styrene | 35.8 | 45.3 |
| Unidentified hydrocarbons | 4.9 | 6.3 |
| p-Terphenyl | 6.1 | 5.5 |
| Percent conversion | 75 | 62 |

We claim as our invention:

1. The process for the preparation of a terphenyl which comprises contacting an unsaturated alpha alkyl styrene dimer with a catalyst of chromia supported on alumina, at temperatures between about 350 and 550° C. for a time between about 1 second and 5 minutes, whereby a reaction product containing a terphenyl is formed 2. The process for the preparation of para-terphenyl which comprises contacting unsaturated dimers of alpha methyl styrene with a catalyst of chromia supported on alumina at temperatures between about 400 and 525° C. for a time between about 1 second and 5 minutes, whereby a reaction product containing para-terphenyl is formed 3. The process for the preparation of para-terphenyl which comprises contacting unsaturated dimers of alpha methyl styrene with a catalyst of chromia supported on alumina promoted with 0.25 to 2% by weight of potassium oxide at temperatures between about 400 and 525° C. for a time between about 1 second and 5 minutes, whereby a reaction product containing para-terphenyl is formed.

References Cited in the file of this patent

UNITED STATES PATENTS

| 2,754,285 | Petropoulos | June 10, 1956 |
| 2,910,511 | Joris | Oct. 27, 1959 |
| 2,918,503 | Adams | Dec. 22, 1959 |

OTHER REFERENCES

Klages: Berichte deut. chem., vol. 35 (1902), page 2640.

Ivanov et al.: Berichte deut. chem., vol. 77 (1944), page 183.